United States Patent
Lloyd et al.

(10) Patent No.: US 9,768,609 B2
(45) Date of Patent: Sep. 19, 2017

(54) PROTECTION SYSTEM AND METHOD FOR AN ELECTRICAL VARIABLE SPEED DOUBLY FED INDUCTION MACHINE

(71) Applicant: ALSTOM TECHNOLOGY LTD, Baden (CH)

(72) Inventors: Graeme Lloyd, Stafford (GB); Li Zou, Stafford (GB); Chang An, Stafford (GB)

(73) Assignee: ALSTOM TECHNOLOGY LTD, Baden (CH)

( * ) Notice: Subject to any disclaimer, the term of this patent is extended or adjusted under 35 U.S.C. 154(b) by 189 days.

(21) Appl. No.: 14/771,367

(22) PCT Filed: Feb. 25, 2014

(86) PCT No.: PCT/EP2014/053648
§ 371 (c)(1),
(2) Date: Aug. 28, 2015

(87) PCT Pub. No.: WO2014/131767
PCT Pub. Date: Sep. 4, 2014

(65) Prior Publication Data
US 2016/0013632 A1    Jan. 14, 2016

(30) Foreign Application Priority Data
Feb. 28, 2013  (EP) .................... 13157281

(51) Int. Cl.
*H02P 1/42* (2006.01)
*H02H 7/06* (2006.01)
(Continued)

(52) U.S. Cl.
CPC ............. *H02H 7/06* (2013.01); *H02H 7/08* (2013.01); *H02H 7/09* (2013.01)

(58) Field of Classification Search
CPC ...... H02M 1/32; H02M 7/53873; H02M 5/10; H02H 3/165; H02H 3/17; H02H 7/08; H02H 7/09; H02H 7/122
(Continued)

(56) References Cited

U.S. PATENT DOCUMENTS 3,942,074 A    3/1976   Graham
4,743,816 A    5/1988   Prather
(Continued)

FOREIGN PATENT DOCUMENTS

CN    101383578 A    3/2009
CN    201774273 U    3/2011
(Continued)

OTHER PUBLICATIONS

International Search Report and Written Opinion for PCT Application No. PCT/EP2014/053648 dated Mar. 27, 2014.
(Continued)

*Primary Examiner* — Bentsu Ro
*Assistant Examiner* — Thai Dinh
(74) *Attorney, Agent, or Firm* — Nixon Peabody LLP; Khaled Shami

(57) ABSTRACT

A protection system for an electrical variable speed doubly fed induction machine having a stator and a rotor, comprising:
  instrument transformers capable of measuring low frequency signals from the rotor and stator, in particular low frequency signals in the range of 0.1 Hz to 6 Hz;
  a protection relay which is configured to receive measurement values from the instrument transformers and to sample said measurements values at a constant sampling rate.

12 Claims, 1 Drawing Sheet

(51) Int. Cl.
*H02H 7/08* (2006.01)
*H02H 7/09* (2006.01)

(58) Field of Classification Search
USPC ....... 318/722, 735, 769, 772, 780, 782, 786, 318/787, 807
See application file for complete search history.

(56) References Cited

U.S. PATENT DOCUMENTS

| | | | | |
|---|---|---|---|---|
| 5,239,251 | A * | 8/1993 | Lauw | H02P 6/005 290/31 |
| 7,330,012 | B2 * | 2/2008 | Ahmad | B60L 1/003 180/165 |
| 7,385,372 | B2 * | 6/2008 | Ahmad | H02P 29/40 180/165 |
| 8,097,971 | B2 * | 1/2012 | Ichinose | H02P 9/007 290/44 |
| 8,896,261 | B2 * | 11/2014 | Bando | H02P 9/007 290/44 |
| 2007/0210651 | A1 | 9/2007 | Ichinose et al. | |

FOREIGN PATENT DOCUMENTS

| | | |
|---|---|---|
| DE | 10 2008 009276 A1 | 8/2009 |
| EP | 2562924 A2 | 2/2013 |

OTHER PUBLICATIONS

European Search Report for European Application No. 13 15 7281 dated Aug. 7, 2013.
International Preliminary Report on Patentability for PCT Application No. PCT/EP2014/053648 dated May 4, 2015.
Blake J. N., et al.: "Interfacing Optical CTs and VTs to Relays and Maters", PES TD 2005/2006 May 21-24, 2006, Piscataway, NJ, USA, IEEE, Piscataway, NJ, USA, May 21, 2006, pp. 1280-1284.
Hongxing Wang, et al.: "Application of Electronic Transformers in Digital Substation", Power system technology and IEEE power India Conference, 2008. Powercon 2008. Joint international conference on, IEEE, Piscataway, NJ, USA, Oct. 12, 2008, pp. 1-5.
Ingram, David M. E., et al.: "Test and evaluation system for multi-protocol sampled value protection schemes", 2011, IEEE Trendheim Powertech: Trondheim, Norway, Jun. 19-23, 2011, IEEE, Piscataway, NJ, Jun. 19, 2011, pp. 1-7.
Office Action dated Apr. 19, 2017, in Chinese Application No. 201480010735.0, 5 pages.

* cited by examiner

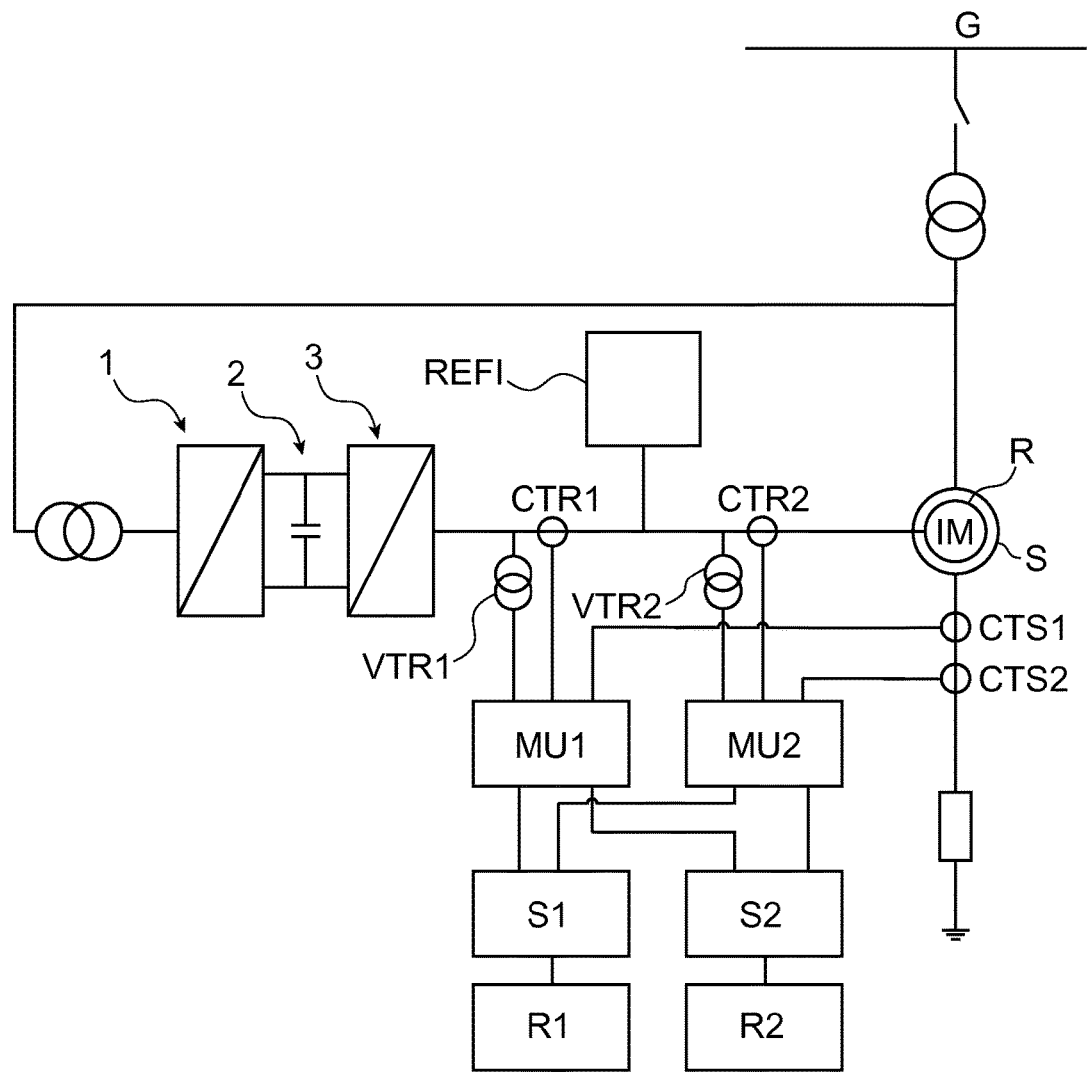

PROTECTION SYSTEM AND METHOD FOR AN ELECTRICAL VARIABLE SPEED DOUBLY FED INDUCTION MACHINE

CROSS-REFERENCE TO RELATED PATENT APPLICATION

The present application is a National Stage Application of International Application No. PCT/EP2014/053648 entitled "PROTECTION SYSTEM AND METHOD FOR AN ELECTRICAL VARIABLE SPEED DOUBLY FED INDUCTION MACHINE" filed Feb. 25, 2014, which claims priority to French Patent Application Number 13 157 281.0 filed Feb. 28, 2013, the contents of which are incorporated herein by reference in their entirety.

FIELD OF THE INVENTION

The field of the invention is that of protection of electrical variable speed doubly fed induction machines such as motors and generators. The invention more precisely relates to a protection relay to provide protection for extremely low frequency currents and voltages in the variable speed rotor and in the stator during the initial start-up and braking

DESCRIPTION OF THE PRIOR ART

Doubly fed electric machines are electric motors or electric generators that have windings on both stationary and rotating parts, where both windings transfer significant power between shaft and electrical system. The stator winding is directly connected to the three-phase grid and the three-phase rotor winding is fed from the grid through a power electronic converter.

The main difficulties when developing relays for the protection of such machines lay with the rotor protection design concerning the dynamic variation of frequency, the extremely low frequency and the effect of the converter power modulation (PWM).

At the moment there is no protection relay available in the market to provide protection for the extremely low frequency currents and voltages in the variable speed rotors (typically 0.1 Hz to 6 Hz in the rotor when running) and in the stator during the initial start-up and braking (0 Hz to 50 Hz/60 Hz).

Moreover, although there is overcurrent and overvoltage protection built in to the power electronic converters connected to the rotor circuit to protect the converters, there is no dedicated protection for the machine rotor.

Indeed conventional protection relays provide mainly stator protection functions which can provide protection down to typically 5 Hz. Some relays can provide protection below the normal frequency range of the standard protection functions. For example an r.m.s. overcurrent start-up protection can be used for low frequencies 2 Hz to 10 Hz for the stator.

It thus appears that conventional protection relays don't provide protection for very low frequencies. This is due to the fact that the Fourier methods, such as the Discrete Fourier transform (DFT) which is typically used in conventional protection relays, are not adequate to provide fast protection for the low frequency application, as the sampling rate has to be aligned to the fundamental frequency before the Fourier methods can correctly calculate the main PWM frequency component and its harmonics. These Fourier methods indeed rely on a frequency tracking technique which provides for a protection execution rate which slows down with the tracked rotor frequency (which as shown above can be as low as 0.1 Hz during normal running)

Also, conventional protection relays are normally connected to iron cored instrument transformers that are not capable of accurately measuring low frequency signals.

There is thus a need for protection relays not using DFT and frequency tracking that would be capable of achieving fast operating times and capable of connection to instrument transformers capable of measuring accurately low frequency signals, so as to guarantee the safety of the machine in all conditions.

SUMMARY OF THE INVENTION

In order to respond to this need, the invention provides a protection system for an electrical variable speed doubly fed induction machine having a stator and a rotor, comprising:
  instrument transformers capable of measuring low frequency signals from the rotor and stator, in particular low frequency signals in the range of 0.1 Hz to 6 Hz;
  a protection relay which is configured to receive measurement values from the instrument transformers and to sample said measurements values at a constant sampling rate.
Certain preferred but not limiting features of this system are as follows:
  the instrument transformers comprise a first set of current transformers for measuring rotor currents, a second set of current transformers for measuring stator currents, and a first set of voltage transformers for measuring rotor voltages;
  the instrument transformers further comprise a second set of redundant voltage transformers for measuring rotor voltages;
  the protection relay is connected to the instrument transformers by means of a merging unit which receives and samples the measurement values from the instrument transformers, the sampled measurement values being transmitted to the protection relay which re-samples the measurement values at said constant sampling rate;
  the protection relay comprises an IEC 61850-9-2 LE compliant interface module to communicate with the merging unit;
  the protection relay comprises at least one protection module configured to implement a protection algorithm;
  the protection algorithm makes use of the measurement values sampled at said constant sampling rate;
  the protection algorithm makes use of root mean square values each calculated for a series of measurement values sampled at said constant sampling rate within a variable window;
  the protection relay comprises a stator overcurrent protection module and/or a rotor overcurrent protection module and/or a rotor overvoltage protection module and/or a rotor overfrequency protection module;
  the protection relay comprises a stator negative phase sequence overcurrent protection module and/or a rotor neutral voltage protection module.
  the protection relay comprises a stator current transformer supervision module configured to block the stator negative phase sequence overcurrent protection module in case of failure of a current transformer associated to the stator;
  the protection relay comprises a voltage transformer supervision module configured to block the rotor neutral voltage protection module in case of failure of a voltage transformer associated to the rotor;

the protection relay comprises a rotor overfrequency protection module;

a quality flag is associated with each sampled measurement value.

DESCRIPTION OF THE DRAWINGS

Other aspects, goals, advantages and features of the invention will appear more clearly on reading the following detailed description of preferred embodiments thereof, given by way of non-limiting example and with reference to the accompanying drawing in which FIG. 1 is a single line diagram showing a possible embodiment of a protection system according to the invention.

DESCRIPTION OF PREFERRED EMBODIMENTS

With reference to FIG. 1, the invention relates to a protection system for an electrical variable speed doubly fed induction machine IM having a stator S and a rotor R.

The induction machine IM has windings on both the stator and the rotor. The n-phase (with n being typically three) stator winding is directly connected to a n-phase grid G and the n-phase rotor winding is fed from the grid G through a power electronic converter which conventionally comprises a grid side converter 1, a DC link 2 and a rotor side converter 3.

The protection system comprises instrument transformers capable of measuring low frequency signals from the rotor and stator, in particular low frequency signals in the range of 0.1 Hz to 6 Hz. Such instrument transformers, also known as non-conventional instrument transformers, such as optical and Rogowski devices, may comprise a first set of current transformers CTRL for measuring rotor currents, a second set of current transformers CTS1 for measuring stator currents, and a first set of voltage transformers VTR1 for measuring rotor voltages. Each set comprises n transformers (with n typically equal to three), one being associated to each phase of the rotor or stator.

In an embodiment, the instrument transformers further comprises a second set of voltage transformers for measuring rotor voltages. AS will be described below, this second, duplicated, set of voltage transformers might be used so as to provide rotor voltage transformer supervision capability.

It will be contemplated that the protection system of FIG. 1 is a redundant one, in that it comprises, in addition to rotor current transformers CTR1, stator current transformers CTS1 and rotor voltage transformers VTR1, further rotor current transformers CTR2, further stator current transformers CTS2 and further rotor voltage transformers VTR2.

The protection system further comprises a protection relay R1 which is configured to receive measurement values from the instrument transformers CTR1, CTS1, VTR1 (and from the duplicated rotor voltage transformers if applicable) and to sample said measurements values at a constant sampling rate.

With such a constant sampling rate, and on the contrary to the frequency tracking technique, the protection execution rate does not slow down with the tracked rotor frequency which can be as low as 0.1 Hz during normal running The protection relay R1 can be connected to the instrument transformers CTR1, CTS1, VTR1 (and the duplicated rotor voltage transformers if applicable) by means of a merging unit MU1 which receives and samples the measurement values from the instrument transformers, the sampled measurement values being transmitted to the protection relay which re-samples the measurement values at said constant sampling rate (in particular when the merging unit does not sample measurement values at the constant sampling rate, otherwise the protection relay merely re-samples at the same rate).

For instance, the protection relay may receive sampled measurement values from the merging unit at 80 samples/cycle (this rate being the one stipulated by the IEC61850-9-2 LE standard). With conventional instrument transformers, a conventional protection relay analogue to digital converter samples at 24/samples per cycle. Therefore, when the relay is used with non conventional instrument transformers and merging units as it is the case in the invention, the protection relay down samples the sampled measurement values at 80 samples/cycle to 24 samples/cycle to be compatible with the existing protection relay algorithms.

In an embodiment, the protection relay R1 comprises an IEC 61850 9-2 LE compliant interface module to communicate with the merging unit Mill. Allocation of the logical nodes for receiving sampled measurement values from the merging unit can be as follows: IA-1, IB-1 and IC-1 for rotor currents (current transformers CTR1), IA-2, IB-2 and IC-2 for stator currents (current transformers CTS1), VA-1, VB-1 and VC-1 for rotor voltages (voltage transformers VTR1), and if applicable VA-2, VB-2 and VC-2 for rotor voltages (voltage transformers VTR2) from a second duplicated set of voltage transformers.

In an embodiment, the protection relay R1 communicates with the merging unit MU1 via an intermediate switch S1, such as an Ethernet switch.

The redundant system of FIG. 1 comprises two protection relays R1, R2, each connected, via a respective switch S1, S2, to a respective set of instrument transformers (VTR1, CTR1, CTS1, for protection relay R1; VTR2, CTR2, CTS2 for protection relay R2) by means of a respective merging unit MU1, MU2. In addition, as shown on FIG. 1, each switch S1, S2 may be configured to receive measurement values from both merging units MU1, MU2 so that each protection relay R1, R2 can also receive voltage measurement values from the voltage transformers VTR2 and VTR1 respectively. Each relay R1, R2 therefore receives duplicated voltage measurement values that can be used to provide rotor voltage transformer supervision capability.

The protection relay R1 comprises at least one protection module configured to implement a protection algorithm. A protection algorithm can make use of the measurement values sampled at said constant sampling rate. A protection algorithm can also make use of root mean square (RMS) values each calculated for a series of measurement values sampled at said constant sampling rate within a variable window. Use of sampled values achieves fast operating times, while use of variable window RMS values achieves better measurement accuracy.

Amongst possible protection modules, that can be implemented alone or in combination, are modules that can use either sampled values or RMS as inputs. These are for instance a stator overcurrent protection module, a rotor overcurrent protection module, a rotor overvoltage protection module, or a rotor overfrequency protection module.

Amongst other possible protection modules, that can be implemented alone or in combination, in particular when the frequency can be reliably obtained, are modules that use RMS values as inputs. These are for instance a stator negative phase sequence overcurrent protection module, or a rotor neutral voltage protection module.

In an embodiment, the protection relay can comprise a rotor overfrequency protection module which makes use of rotor frequency measurements calculated by means of a zero-crossing based technique.

These protection modules ensure protection for frequencies in the range of 0.1 to 70 Hz, during the induction machine IM start-up, braking and normal running In an embodiment, the protection relay comprises a stator current transformer supervision module configured to block the stator negative phase sequence overcurrent protection module in case of failure of a current transformer associated to the stator. This stator current transformer supervision module operates in a conventional manner by detecting the presence of residual current in the absence of residual voltage. The residual current is derived from the sampled values of the three phase stator currents and the stator current transformer supervision uses the RMS value of such sampled values. As the protection relay may not be directly connected to measuring means of the stator voltages, it may not be possible to get direct information as to the residual voltage. In such case, knowledge of the residual voltage may come from an external source, such as a conventional stator protection relay using conventional instrument transformers.

In an embodiment the protection relay receives measurement values from two redundant sets of rotor voltage transformers, and comprises a rotor voltage transformer supervision module configured to block the rotor neutral voltage protection module in case of failure of a voltage transformer associated to the rotor. This rotor voltage transformer supervision module implements a balance voltage method as used in older generator protection relays according to which the difference between the voltages from the two set o voltage transformers is used to indicate a failure of one of the voltage transformers.

In an embodiment, as any degradation in the measurement or transmission of measurement values may result in the protection modules of the protection relay not operating correctly, a quality flag is associated with each sampled measurement value so that questionable data may be detected and the protection relay may adapt the behavior of the protection modules according to the quality flags.

As for the IEC 61850-9-2 LE protocol, a quality flag may have three states "Good", "Invalid" or "Questionable". For protection modules to work correctly, all the necessary sampled values should have Good quality. Samples that have an Invalid or Questionable quality could result in unacceptable performance from the protection modules. Hence reception of an Invalid or Questionable flag may result in freezing and/or in inhibiting a protection module.

The way that the protection relay treats questionable data is user configurable. However, the default setting can be changed to "Trust Questionable Data" for one or more specific type, such as Out Of Range.

It shall be noted that IEC 61850-9-2 LE quality flags will not be able to determine if there is loss of 1 or 3 phase current signals due to a current transformer fault or when the machine is out of service so current transformer supervision is required in addition to the quality flags for the stator negative phase sequence overcurrent protection.

As shown above, the rotor voltage transformer supervision is based on a voltage balance method. It shall be noted that IEC 61850-9-2 LE quality flags will not be able to determine if there is loss of 1 or 3 phase voltage signals due to a voltage transformer fault or when the machine is out of service or if there is a single phase fault for example. Rotor voltage transformer supervision is therefore required in addition to the quality flags for the rotor neutral voltage protection.

The protection system described above has the following advantages.

Both rotor and stator of a variable speed doubly fed induction motors and generators are protected from damaging rotor and stator faults such as overcurrents and overvoltages caused by phase and earth faults and excessive slip frequencies during normal running, the start-up and braking in both motor and generator modes.

Maximum protection availability is achieved with redundant non conventional instrument transformers (NCITs), merging units and protection relays.

Use of NCITs has particular benefits for generator applications. Conventional generator current transformers (CTs) can physically be very large whereas NCITs are much smaller and can measure very large currents more accurately. Also, the X/R ratio of generator fault currents can be very high causing saturation with conventional CTs whereas NCITs don't suffer from saturation and so provide a more accurate linear output.

An open standard (IEC61850 9-2 LE) can be used to interface the protection relay with the NCITs making integration of different vendors products easier.

Communications between the merging unit and the protection relay can use Ethernet fiber optic communications instead of copper wiring used with conventional CT wiring. Security is enhanced by the use of fiber optic Ethernet connections for any links which run outside of a single local cabinet, such that there are no long, cross-site runs of copper-based communications. This eliminates the risk of induced interference, thereby boosting both security and dependability.

The invention is not limited to the above-described protection system, but also extends to a method implemented by such a protection system, and in particular to a method for protecting an electrical variable speed doubly fed induction machine having a stator and a rotor, comprising, at a protection relay (R1, R2), receiving measurement values from instrument transformers capable of measuring low frequency signals from the rotor and stator, in particular low frequency signals in the range of 0.1 Hz to 6 Hz, and sampling said measurements values at a constant sampling rate.

The invention claimed is:

1. A protection system for both stator and rotor of an electrical variable speed doubly fed induction machine, comprising:
    instrument transformers capable of measuring low frequency signals from the rotor and stator in the range of 0.1 Hz to 6 Hz;
    a protection relay against damaging rotor and stator faults caused during the induction machine start-up, braking and normal running, said protection relay being configured to receive measurement values from the instrument transformers and to sample said measurements values at a constant sampling rate, said protection relay comprising at least one protection module configured to implement a protection algorithm making use of the measurement values sampled at the constant sampling rate, or making use of root mean square values each calculated for a series of the measurement values sampled at the constant sampling rate within a variable window.

2. The protection system of claim 1, wherein the instrument transformers comprise a first set of current transformers for measuring rotor currents, a second set of current transformers for measuring stator currents, and a first set of voltage transformers for measuring rotor voltages.

3. The protection system of claim 2, wherein the instrument transformers further comprise a second set of redundant voltage transformers for measuring rotor voltages.

4. The protection system of claim 1, wherein the protection relay is connected to the instrument transformers by means of a merging unit which receives and samples the measurement values from the instrument transformers, the sampled measurement values being transmitted to the protection relay which re-samples the measurement values at said constant sampling rate.

5. The protection system of claim 4, wherein the protection relay comprises an IEC 61850-9-2 LE compliant interface module to communicate with the merging unit.

6. The protection system of claim 1, wherein the at least one protection module comprises a stator overcurrent protection module and/or a rotor overcurrent protection module and/or a rotor overvoltage protection module and/or a rotor overfrequency protection module.

7. The protection system of claim 1, wherein the at least one protection module comprises a stator negative phase sequence overcurrent protection module making use of said root mean square values and/or a rotor neutral voltage protection module making use of said root mean square values.

8. The protection system of claim 7, wherein the protection relay comprises a stator current transformer supervision module configured to block the stator negative phase sequence overcurrent protection module in case of failure of a current transformer associated to the stator.

9. The protection system of claim 7, wherein the instrument transformers comprise a first set of current transformers for measuring rotor currents, a second set of current transformers for measuring stator currents, a first set of voltage transformers for measuring rotor voltages, and a second set of redundant voltage transformers for measuring rotor voltages, and wherein the protection relay comprises a voltage transformer supervision module configured to block the rotor neutral voltage protection module in case of failure of a voltage transformer associated to the rotor.

10. The protection relay of claim 1, wherein the protection relay comprises a rotor overfrequency protection module.

11. The protection system of claim 1, wherein a quality flag is associated with each sampled measurement value.

12. A method for protecting both stator and rotor of an electrical variable speed doubly fed induction machine, comprising, at a protection relay, receiving measurement values from instrument transformers capable of measuring low frequency signals from the rotor and stator in the range of 0.1 Hz to 6 Hz, sampling the measurement values at a constant sampling rate, and implementing at least one protection algorithm to provide protection against damaging rotor and stator faults caused during the induction machine start-up, braking and normal running, said at least one protection algorithm making use of the measurement values sampled at the constant sampling rate, or making use of root mean square values each calculated for a series of the measurement values sampled at the constant sampling rate within a variable window.

* * * * *